United States Patent [19]
Heirich

[11] Patent Number: 5,801,758
[45] Date of Patent: Sep. 1, 1998

[54] SYSTEM AND METHOD FOR IMAGE CAPTURE AND DISPLAY UTILIZING TIME SHARING ACROSS A SINGLE, TWO-WAY OPTICAL PATH

[75] Inventor: Douglas L. Heirich, Redwood City, Calif.

[73] Assignee: Apple Computer, Inc., Cupertino, Calif.

[21] Appl. No.: 492,926

[22] Filed: Jun. 21, 1995

[51] Int. Cl.$^6$ .................................... H04N 7/14
[52] U.S. Cl. ............................... 348/20; 348/14
[58] Field of Search ...................... 348/20, 14, 15, 348/16, 17, 18, 19

[56]  References Cited

U.S. PATENT DOCUMENTS

| | | | |
|---|---|---|---|
| 4,928,301 | 5/1990 | Smoot | 348/20 |
| 5,079,627 | 1/1992 | Filo | 348/17 |
| 5,612,734 | 3/1997 | Nelson et al. | 348/20 |

Primary Examiner—Stella Woo
Attorney, Agent, or Firm—Fenwick & West LLP

[57]  ABSTRACT

A video conferencing system includes a display screen, a switching device, a rear-projection projector and a camera. The switching device regulates use of a single optical path by alternating between use by the projector and the camera. In the image projection mode, projected light from the projector passes onto the screen uninterrupted. In the image capture mode, the light from the projector is blocked by the switching device, and the ambient room lighting is allowed to pass through the screen and is reflected by the switching device toward the camera. The problem of loss of eye contact between system users is eliminated by time sharing a single optical path. Part of the time, the projector is allowed to use the optical path and an image is projected onto the screen for a first user to view. The other part of the time the camera uses the optical path to receive an incoming image of the first user transmitted to the camera to be captured. When the optical path is used by the camera (the capture cycle), no image is projected on the screen since the the projected light remains blocked by the switching device. However, the duration of the capture cycle is such that the user's perception seamlessly integrates the absence of the projected image during image capture with the projected image at other times to present what appears to be full, uninterrupted projection of an image in real time.

14 Claims, 6 Drawing Sheets

SYSTEM AND METHOD FOR IMAGE CAPTURE AND DISPLAY UTILIZING TIME SHARING ACROSS A SINGLE, TWO-WAY OPTICAL PATH

BACKGROUND OF THE INVENTION

1. Field of the Invention

This invention relates generally to image capture and display systems, and more particularly, to a system for video conferencing whereby a switching device controls usage of a single, two-way optical path between an image projection system and an image capture system to provide the illusion of eye contact between users.

2. Description of the Background Art

Typical video conferencing systems include a display screen and a camera for each user. In a system with two users, the first user is provided with a first display screen and a first camera proximate his location while the second user has a second display screen and a second camera proximate his location. During video conferencing, the first user observes an image of the second user upon the first display screen. At the same time, the first user's image is captured by the first camera and projected upon the second display screen. The second user observes the image of the first user on the second screen while a second camera simultaneously captures an image of the second user and projects that image upon the first screen. In the prior art, the projector and the camera associated with the same user operate on different optical paths. When the first user is looking at the image of the second user on the first screen, the first user is looking away from the camera. For example, consider a video conferencing system that uses a conventional computer monitor as the display device and a camera mounted on the side, top or bottom of the monitor housing. Because of the closeness of user to the monitor and the camera being positioned at the periphery of the monitor's display screen, the perspective or angle at which the image of the user is captured is not optimum and the image captured shows the user as looking away from the camera. Thus, the first camera receives an image of the first user that is indirect. As the image from the first camera is projected onto the second screen, the second user also sees an indirect image of the first user (i.e., the second user sees the first user's image as looking away from the line of sight of the second user), and thus there is no "eye contact" between users. Only when the first user is looking directly at the camera (and not at the image of the second user upon the first screen) will there be eye contact between the second user (looking at the second screen) and the first user (looking into the camera). However, users rarely if ever change their head position and eye contact to focus on the camera instead of the display, and even when they do such adjustments in user head position are not natural and require significant concentration and effort. Such prior art systems are problematic because of their inability to capture a direct, full-face image of the user. In summary, there is never a time when both users are looking at each other's direct, full-face images upon the screen and having eye contact.

Figure 1:
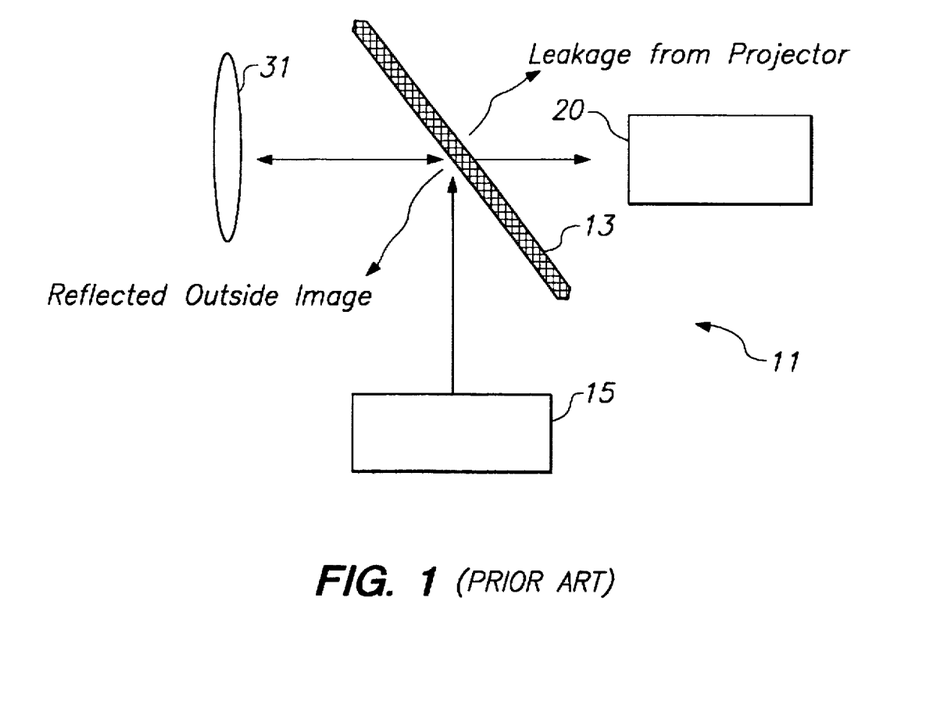
FIG. 1 is a schematic illustration of an image capture and display system in accordance with the prior art.

In an effort to create the illusion of eye contact, a rear projection system with stationary half-silvered mirrors was developed to allow simultaneous use of a single optical path for image projection and image capture. FIG. 1 is a schematic illustration of an image capture and display system 11 in accordance with the prior art. The prior art system 11 comprises a half-silvered mirror 13 optically coupled to a standard projector 15, a camera 20 and an optical system 31.

The half-silvered mirror 13 is made of glass having aluminum deposited thereon for reflective purposes where the density of the aluminum is less than that of a common, fully reflective mirror. Where a common mirror reflects all light striking its surface, the half silvered mirror reflects a portion of the light projected thereupon and passes a portion of the light therethrough. One example of a half-silvered mirror is a two-way mirror. In the prior art system 11, the projector 15 continuously projects light 17 in the form of a first image onto the half-silvered mirror 13. A portion of the light 17 is reflected off the mirror 13 and passes through an optical system 31 and onto a display screen (not shown). Simultaneous with the projection, ambient light carrying a second image continuously passes through the half silvered mirror 13, onto a camera 20 which in turn captures the image. The camera 20 continuously receives the second image through the half-silvered mirror 13 while the first image is continuously being projected and reflected off the half-silvered mirror 13. Therefore, both the projector 15 and the camera 20 are in operation simultaneously and continuously. Such prior art systems 11 have particularly poor image quality for both the images captured and the images displayed because they have an inferior resolution capability due to the simultaneous image capture and image presentation. This system also suffers from poor image display quality due to the low levels of light that are reflected off of the half silvered mirror. Another disadvantage of this type of system is cross-talk (i.e., interference between output and reception signals) which exists because both the image projector and the image capture apparatuses are operating simultaneously at all times along the same optical path. Cross-talk creates dark, shadowy and fuzzy images as well as other artifacts.

What is needed is a video conferencing system that provides for good eye contact between users and provides full resolution for both the projection system and the image capture system.

SUMMARY OF THE INVENTION

The present invention is a video conferencing system where the image projected and the image captured are transmitted along a single optical path so that the participants maintain eye-contact during the conference. The preferred embodiment of the video conferencing system comprises a display screen, a switching device, a rear-projection projector and a camera. The display screen, switching device, and rear-projection projector are disposed in series along a two-way optical path. The camera is disposed perpendicular to the optical path and is optically coupled to the switching device.

The switching device regulates usage of the optical path between the projector and the camera. In the preferred embodiment, the switching device comprises a rotatable disk made of generally transparent material where a portion of the disk is mirrored. As the disk is rotated, the transparent portion and the mirrored portion alternately intercept the optical path. The system is in the image projection mode when the transparent portion of the disk intercepts the optical path. The system is in the image projection mode because images output by the projector are able to pass along the optical path through the transparent portion of the disk and onto the screen. The transparent portion of the disk also does not reflect any images transmitted from the screen to the disk, thus there is nothing for the camera to capture. The system is in the image capture mode when the mirrored portion of the disk intercepts the optical path. During the image capture mode the mirrored portion of the disk is disposed in the optical path and blocks any images output by the projector. The mirrored portion of the disk also reflects images input through the screen to the camera.

The projector outputs an image at all times. The projector receives a signal representing an image from an image capture source (not shown), and continuously projects light along the optical path. In the image projection mode, the transparent portion of the rotating disk intercepts the optical path, but because it is transparent, allows the projected light to pass onto the screen uninterrupted. In the image capture mode, the mirrored portion of the rotating disk intercepts the optical path. The light from the projector is transmitted onto a black back of the mirrored portion, and is blocked from passing through the disk. Thus, the projection of the image onto the screen is interrupted every time the mirrored portion of the rotating disk intercepts the optical path. The interruption of the projected light allows the ambient room lighting to pass through the screen in the opposite direction from the projection path. The ambient light comes into the system through the screen, reflects off the mirrored portion, and enters the camera.

In operation, the problem of loss of eye contact between system users is eliminated by utilizing a single optical path. Use of the single optical path is time shared by switching between full operation of the projector and full operation of the camera, such that part of the time only the projector uses the optical path and the other part of the time only the camera uses the optical path. When the transparent portion of the disk is rotating through the optical path, the image formed by the light being transmitted by the projector is displayed upon the screen. A first user faces the screen and sees the image. When the mirrored portion of the disk is rotating through the optical path, the light being transmitted by the projector is blocked and instead, the user's image enters the system along the optical path with the ambient light. The image is reflected off the mirrored portion and re-directed toward the camera. The user's image is captured by the camera and output to one or more other image projection apparatuses coupled to the system.

During the portion of the time that the camera uses the optical path (the capture cycle), the light being transmitted by the projector is blocked. As such, there is an absence of light projection during the capture cycle. In the preferred embodiment, the capture cycle is preferably one-fifth of one cycle. Therefore, the portion of the time that the projector is projecting an image that the user can see is much greater than the portion of the time that the projected light is blocked. Where the disk is rotating at approximately thirty cycles per second, the user's perception seamlessly integrates the absence of the projected image during the capture cycle with the projected image at all other times, and sees what appears to be full, uninterrupted projection of an image in real time.

DETAILED DESCRIPTION OF THE PREFERRED EMBODIMENT

Figure 2:
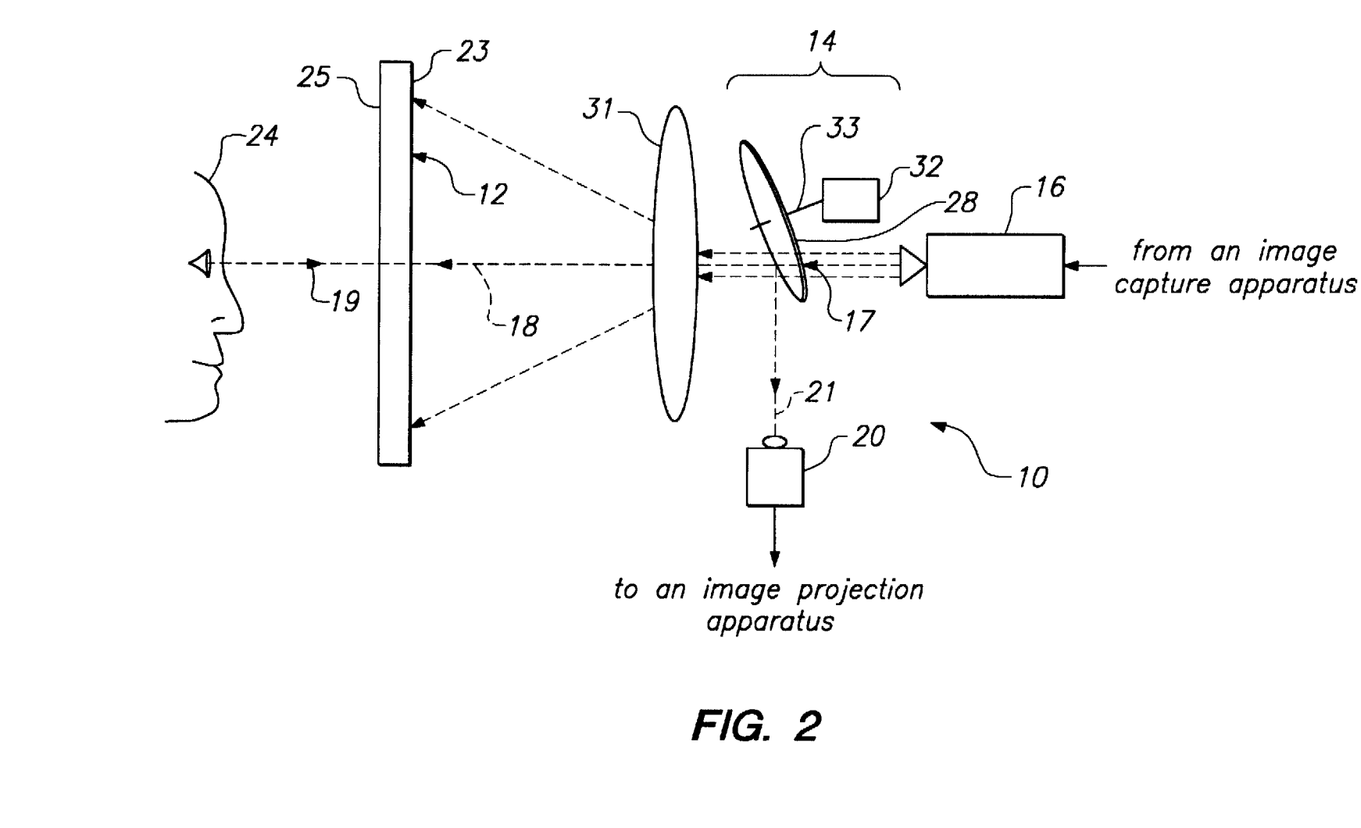
FIG. 2 is a schematic illustration of a video conferencing system constructed in accordance with the first and preferred embodiment of the present invention.

Referring now to FIG. 2, a schematic illustration of a video conferencing system 10 built in accordance with a first and preferred embodiment of the present invention is shown. The system preferably comprises a display screen 12, an optical system 31, a switching device 14, and a projector 16 disposed in series along a two-way optical path 18. A camera 20 is disposed in a optical path 21 perpendicular to the two-way optical path 18, and is optically coupled to the switching device 14. The projector 16 projects light 17 in the form of an image onto the screen 12. In order to achieve projection and reception along the single optical path 18, a "rear-projection" projector is utilized for the projector 16. In a rear-projection projector, an image is projected on a screen for viewing from the opposite side of the screen. In the preferred embodiment of the present invention, the rear-projection projector 16 comprises existing projection elements such as those made by Seiko and Panasonic, with a corresponding optics system that would expand the light 17 to fit the screen 12.

The display screen 12 is a highly transparent surface that is used to display the light 17 in the form of an image being projected by the projector 16. The projected light 17 is transferred from the projector 16 along the two-way optical path 18 and cast upon the back 23 of the screen 12. A first user 24 views the image from the front 25 of the screen 12. The screen 12 may be any type of two-way medium such as plexiglass or antiglare glass, but is preferably a sheet of clear glass, because glass allows for a maximum amount of light to enter the system 10. Typically, the inner environment of the system 10 is painted black so that incoming light is absorbed and the inner workings of the system 10 will not be seen by the first user 24 through the screen 12.

The optical system 31 is disposed in coaxial alignment with the optical path 18 to expand the image being projected by the projector 16. The projected light 17 provides an image having an unchanging diameter. In an effort to maintain the compactness of the system 10, the projected light 17 beam is small, typically 1 inch in diameter. As the projected light 17 passes through the optical system 31, the light 17 diverges in order to fill the screen 12 with the image.

The switching device 14, disposed in the optical path 18 to intercept images received and projected, regulates control of the optical path 18 by alternating use thereof between the projector 16 and the camera 20. Part of the time, the switching device 14 allows the light 17 transmitted from the projector 16 to pass along the optical path 18 to the screen 12. The other part of the time, the switching device 14 blocks the transmission of light 17 by the projector 16, thus allowing ambient light 19 to come in through the screen 12 along the optical path 18 to the switching device 14. The incoming ambient light 19 is reflected off of the switching device 14 and directed toward the camera 20. The camera 20 captures the incoming ambient light 19 in the form of the first user's image, and outputs the image to a second user (not shown).

The single optical path 18 is utilized in two ways; first as a transmitter path for light 17 from the projector 16 to the screen 12, and second as a receiver path for light 19 incoming through the screen 12 to the switching device 14. Generally, the system 10 continuously and automatically switches between projection and reception operating modes at the preferred rate of thirty times per second. The operation of the system 10 in the image projection mode and the image capture mode is further discussed with reference to FIGS. 4 and 5, respectively. Although the distances between elements is not critical to the operation of the system 10, the preferred distance between the optical system 31 and the screen 12 is such that the expanded image fills all of the available area of the screen 12.

Figure 3:
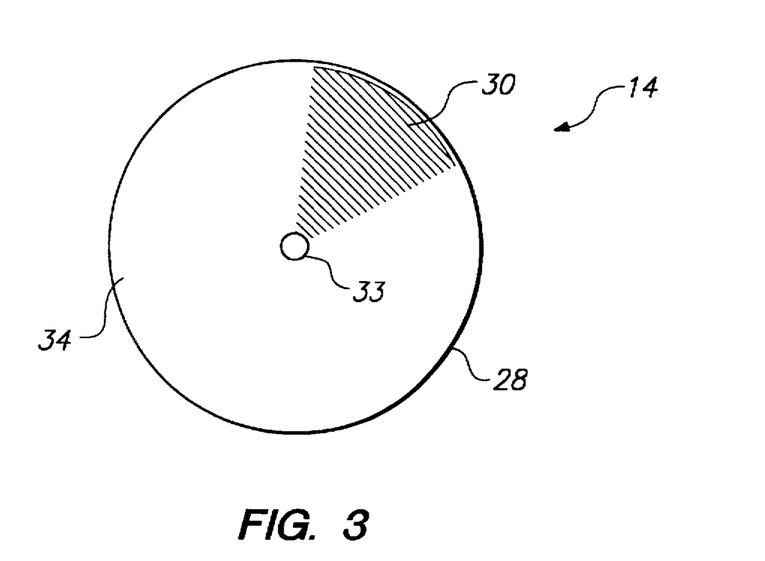
FIG. 3 is a plan view of a partially mirrored disk that is utilized in the system of FIG. 2.

Referring now to FIG. 3, the preferred embodiment of a portion of the switching device 14 is shown. In the preferred embodiment, the switching device 14 comprises a motor 32 (FIG. 2), a shaft 33 and rotatable disk 28. The disk 28 is made of generally transparent material where a portion 30 of the disk is mirrored. The disk 28 is preferably made of polished glass, however other types of transparent and/or mirrored materials may equivalently be used. The preferred size of the disk 28 depends upon the diameter of the beam being projected along the optical path 18. For example, where a 1" diameter beam is projected, the preferred disk size is 4" in diameter. The radius of the disk 28 must be larger than the beam diameter, in order to fully block the projected light during the image capture mode. The mirrored portion 30 is made of aluminum that is deposited, or photo etched, on to the disk 28. The back 35 of the mirrored portion 30 is preferably coated with an antiglare material. The shape of the mirrored portion 30 is preferably triangular, pie or wedge shaped, which provides a clean beginning and ending to the mirrored portion 30 as the disk 28 is rotated through the optical path 18. The disk 28 is connected to a motor 32 (FIG. 2) which causes the disk 28 to rotate at a predetermined rate, preferably thirty times per second. As the disk 28 is rotated, the transparent portion 34 and the mirrored portion 30 alternately intercept the optical path 18.

Although the disk 28 of the preferred embodiment is shown as being approximately 80 percent transparent and 20 percent mirrored, these ratios may be modified to provide maximum efficiency, depending on the type of image being captured or projected. Efficient ratios can vary from 50 percent mirrored/50 percent transparent, to 5 percent mirrored/95 percent transparent. For example, where the camera 20 used in the system 10 has a very sensitive pick up, the incoming light 19 need not be reflected for as long of a time, and so a disk 28 with surface of 10 percent mirror/90 percent transparent would provide the most efficient ratio for maximizing the brightness and clarity of the light 17 projected.

Figure 4:
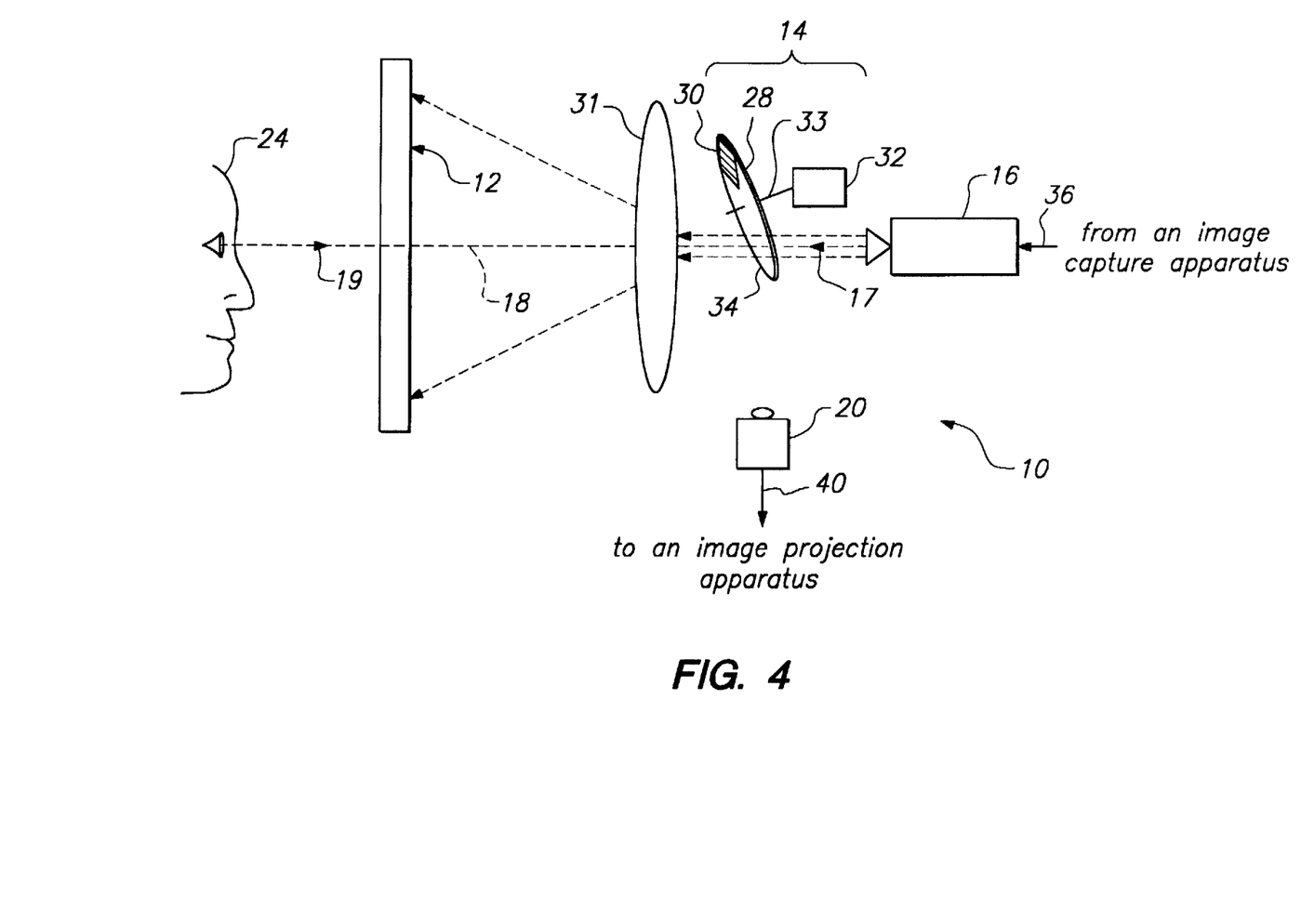
FIG. 4 is a schematic illustration of the video conferencing system constructed in accordance with the first and preferred embodiment of the present invention in the image projection mode.

Referring now to FIG. 4, a schematic illustration of the video conferencing system 10 of the present invention in the image projection mode is shown. Generally, the projector 16 outputs an image at all times. The projector 16 receives an input signal on a line 36 from an image capture apparatus (not shown), and continuously projects light 17 along the optical path 18 toward the screen 12. In the image projection mode, the transparent portion 34 of the rotating disk 28 is disposed in the optical path 18, but because it is transparent, allows the projected light 17 to pass through the optical system 31 onto the screen 12 uninterrupted. In this way, the projector 16 uses the optical path 18 during the time that the transparent portion 34 of the rotating disk 28 is positioned in the optical path 18. In FIG. 4, the mirrored portion 30 of the rotating disk 28 is shown away from the optical path 18. Also, since the transparent portion 34 of the disk 28 does not reflect light, no image is input to the camera 20 along optical path 21.

Figure 5:
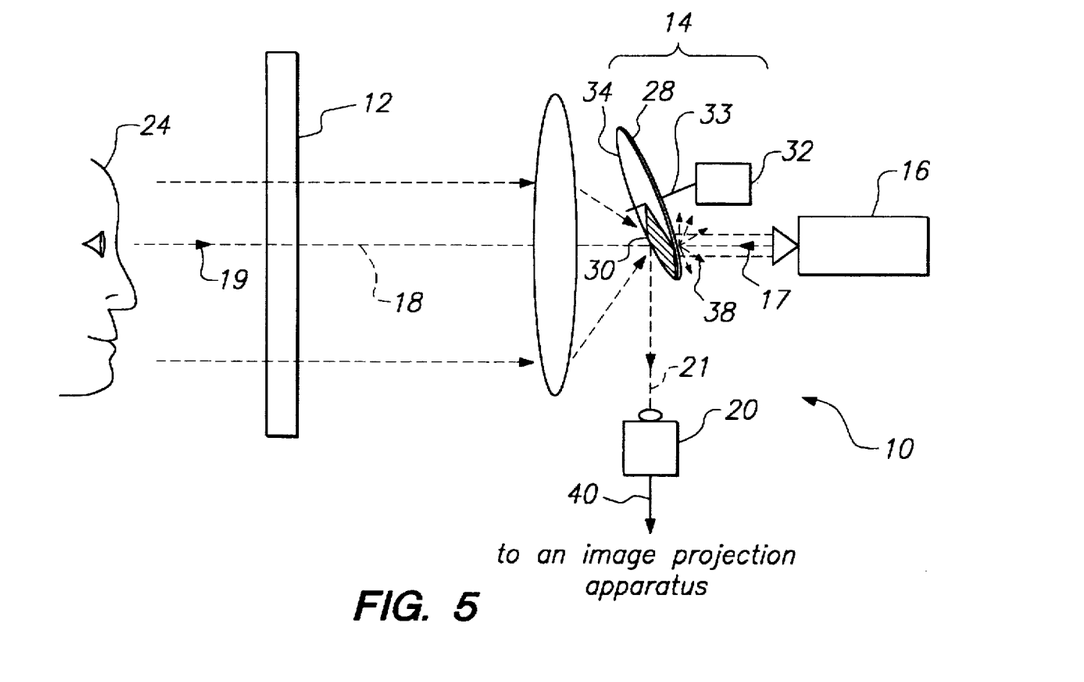
FIG. 5 is a schematic illustration of the video conferencing system constructed in accordance with the first and preferred embodiment of the present invention in the image capture mode.

Referring now to FIG. 5, a schematic illustration of the video conferencing system 10 of the present invention in the image capture mode is shown. In the image capture mode, the mirrored portion 30 of the rotating disk 28 is positioned in the optical path 18. The light 17 from the projector 16 is transmitted onto the back 38 of the mirrored portion 30, and is blocked from passing through the disk 28 to the screen 12. Thus, the projection of the image onto the screen 12 is interrupted every time the mirrored portion 30 of the rotating disk 28 intercepts the optical path 18.

The interruption of the projected light 17 allows the ambient room lighting 19 to pass through the screen 12 and optical system 31 in the opposite direction from the projection path toward the switching device 14. The ambient light 19 comes into the system 10 through the screen 12, reflects off of the mirrored portion 30, is redirected along optical path 21, and enters the camera 20. As illustrated in FIG. 5, the first user 24 is present and thus it is the user's image that is carried into the system 10 with the incoming ambient light 19, reflected off of the mirrored portion 30 and captured by the camera 20. Preferably, the operation of the camera 20 is strobed such that the camera 20 is active only when the mirrored portion 30 of the disk 28 intercepts the optical path 18. Where the camera 20 operation is not strobed and the camera 20 is left on at all times, low levels of scattered light (not shown) are captured by the camera 20 during the time that the projector 16 dominates the optical path 18. This low level, scattered light is averaged in with the incoming brighter ambient light 19 periodically being reflected off of the mirrored portion 30 into the camera 20, and the result is that the image is darker overall. Thus, where the camera's operation is strobed, only the bright, clear images being reflected off of the mirrored portion 30 of the disk 28 are captured. The result is that the camera 20 takes a series of bright clear image samples.

In operation of the present invention 10, the problem of loss of eye contact between system users is eliminated by utilizing the single optical path 18. Use of the optical path 18 is altered by switching between full operation of the projector 16 and full operation of the camera 20, such that part of the time only the projector 16 uses the optical path 18 and the other part of the time only the camera 20 uses the optical path 18. When the transparent portion 34 of the disk 28 is rotating through the optical path 18, the image formed by the light 17 being transmitted by the projector 16 is displayed upon the screen 12. The first user 24 faces the screen 12 and sees the image. When the mirrored portion 30 of the disk 28 is rotated through the optical path 18, the light 17 being transmitted by the projector 16 is blocked so that the user's image enters the system 10 with the ambient light 19 along the optical path 18. The light 19 comprising the user's image, is reflected off of the mirrored portion 30 and redirected toward the camera 20. The user's image is captured by the camera 20 and output 40 to one or more other image projection apparatuses joined in the video conference (not shown).

Figure 6:
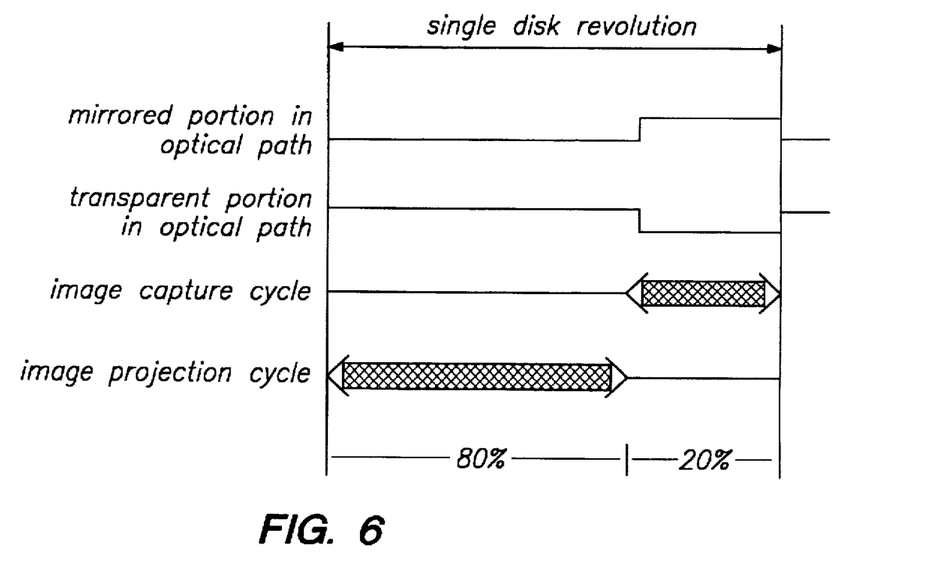
FIG. 6 is a timing diagram illustrating the image capture cycle and the image projection cycle for a single revolution of the disk.

Referring now to FIG. 6, a timing diagram illustrating the image capture cycle and image projection cycle for a single disk revolution is shown. Preferably, the transparent portion 34 comprises eighty percent of the disk 28, while the mirrored portion 30 comprises twenty percent. The image capture cycle relates to the time that the mirrored portion 30 intercepts the optical path 18. The image projection cycle relates to the time that the transparent portion 28 intercepts the optical path 18. For a single revolution of the disk 28, the image projected by the projector 16 is transmitted along the optical path 18, through the transparent portion 34 of the disk 28, and onto the screen 12, eighty percent of the time. The other twenty percent of the time, the mirrored portion 30 blocks image projection, thus allowing the user's image to enter through the screen with the ambient light 19 and be reflected off of the mirrored portion 30 and into the camera 20.

The most efficient rate of revolution of the disk 28 is determined by the sophistication of the camera 20 and projector 16 used, and also by the types of images being captured and/or projected. For example, where a video conference is between two users who wish to see each other's faces upon the screen 12, the preferred rate of revolution of the disk 28 is thirty times per second. This rate is similar to the common video frame rate used in television broadcast. The rate of revolution will typically be between 10 and 40 revolutions per second. The time of operation of the camera 20 (the image capture cycle) is short so that the user's perception seamlessly integrates the absence of the projected image during image capture with the projected image at all other times and sees what appears to be full, uninterrupted projection of an image in real time. If the rate of revolution is brought to ten times per second, the image captured by the camera and projected on a participating screen 12 will be viewed by the second user as having jerky movements. A captured image is displayed upon a participating screen as a still frame until a subsequent image is captured and transmitted to the participating screen. The jerkiness between images is the result of an increase in the time between image captures. Where the rate of capture and display is approximately thirty times a second, the human eye will assimilate the series of still frames to perceive fluid movement of the image. Where there is too much time between image captures, the fluidity of movement is lost and jerkiness results. For example, on a disk that is 80 percent transparent and 20 percent mirrored, the rate of revolution of thirty times per second is preferred for a clear, fluid image. At the rate of fifteen revolutions per second, image movement appears jerky. A slower rate, say for example the rate of ten times per second, would suffice where no movement of the image is involved; such as where the image being transmitted is a stationary piece of paper upon which text or a drawing appears, held up to the participating camera.

Figure 7:
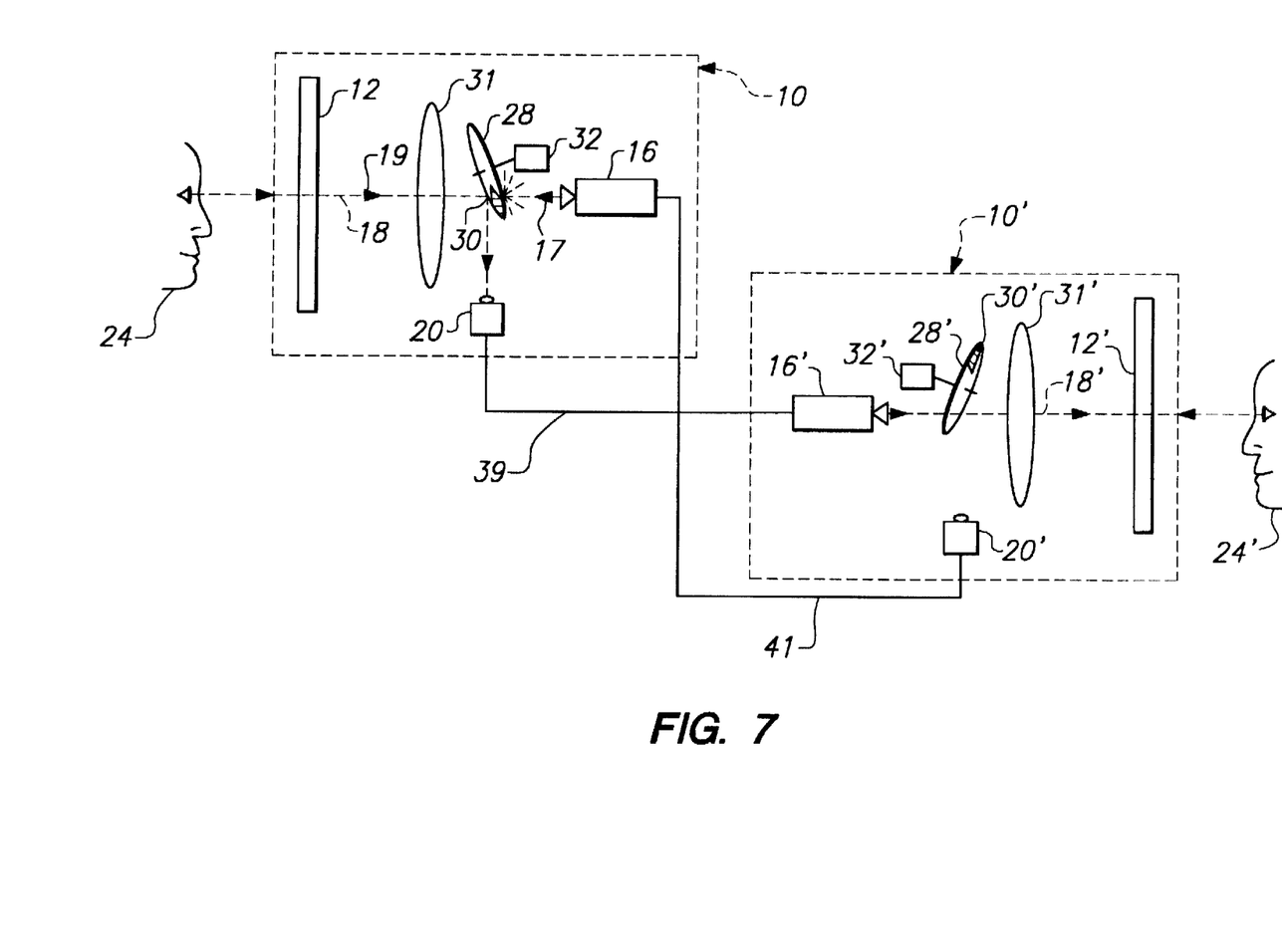
FIG. 7 is a schematic illustration of a video conference between two users both utilizing video conferencing systems constructed in accordance with the present invention.

Referring now to FIG. 7, a schematic illustration is shown of a video conference between two users 24, 24' each utilizing the video conferencing system 10, 10' in accordance with the present invention. For ease of understanding, like part numbers have been used for like parts in this embodiment. Again, each system 10, 10' uses a single, bi-directional optical path 18, 18' with time sharing capabilities to create the illusion of face to face contact for a real time conference. System 10 is coupled to system 10' by lines 39 and 41. The first user's 24 image is output from the camera 20 of system 10 on line 39. Line 39 is also the input to the projector 16' of system 10'. Similarly, the output from system 10' is the second user's 24' image which is captured by camera 20' and transmitted along line 41 to the input of projector 16 in system 10.

In operation, the first projector 16 projects an image of the second user 24' along the optical path 18 to a display screen 12. The first user 24, positioned in line with the optical path 18, views the image of the second user on the first screen 12. The motor 32 rotates the disk 28 at the preferred rate of thirty revolutions per second. Therefore, the mirrored portion 30 of the rotating disk 28 intercepts the optical path 18 thirty times a second. During the time that the mirrored portion 30 is intercepting the optical path 18, the light 17 from the projector 16 is blocked and ambient light 19 enters the system 10. The ambient light 19 carries the image of the first user 24 to the mirrored portion 30, where the light 19 is reflected and directed toward a camera 20. The camera 20 captures the image of the first user 24 taken along the same optical path 18 that the projector 16 uses to transmit the image of the second user 24'. Therefore, since the first user's image is captured along the same optical path 18 that the second user's image is projected, the captured image of the first user 24, when displayed upon the second screen 12' and viewed by the second user 24' will appear to have eye contact with the second user 24'. Likewise, where an image of the second user 24' is captured by a separate camera 20' and transmitted to the projector 16 utilized by the first user 24, the image of the second user 24' upon the screen 12 of the first user 24 will appear to have eye contact with the first user 24.

The problem of dark, fuzzy or muddy picture quality is greatly reduced because each independent operation of projection and image capture is in full operation for the portion of time each is allowed to be dominant. In this way, the maximum amount of light available for each function is utilized, providing for bright projection and capture images. Also, because only one apparatus, either the projector 16 or the camera 20, is operating at a time, cross-talk is eliminated which greatly enhances the clarity of the image projected onto the screen 12.

Figure 8:
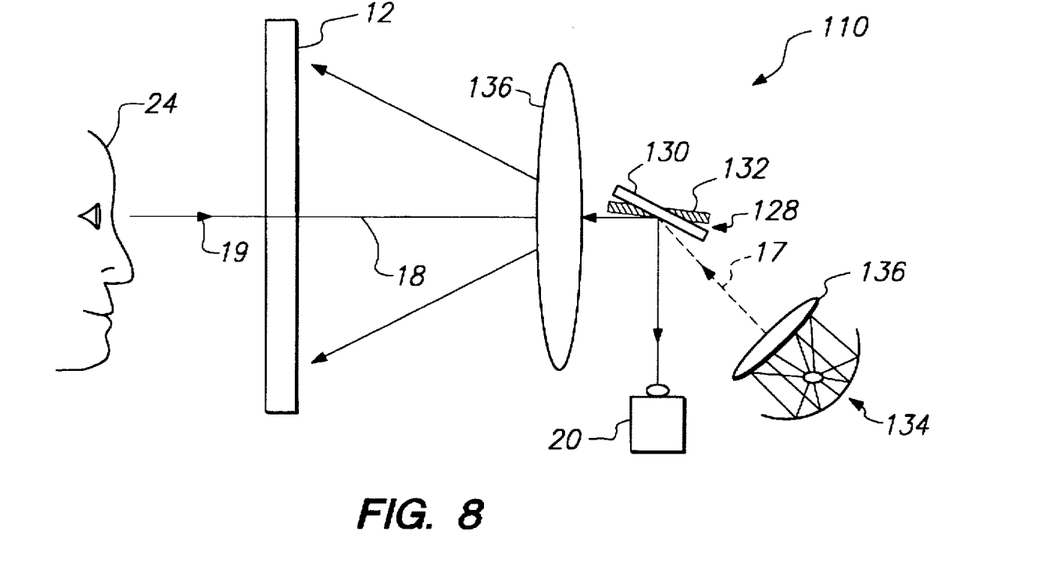
FIG. 8 is a second and alternative embodiment of the video conferencing system of the present invention, wherein micro-mirror technology is utilized as the switching device.

Referring now to FIG. 8, a second and alternate embodiment 110 of the video conferencing system of the present invention is shown. In this alternative embodiment 110, micro-mirror technology is utilized as the switching device 128.

In the alternative embodiment shown in FIG. 8, the switching device 128 is a digital micro-mirror device array. Each micro-mirror device in the array comprises a mirror element that is supported between two posts by a pair of torsion hinges. The mirror element can rotate ±10 degrees, and moves in response to changes in computer controlled signals. The micro-mirror device is an array of mirror elements made by Texas Instruments. However, for clarity, a single mirror element 128 is illustrated as representing the micro-mirror device array. In a first position 130, the mirror element 128 reflects incoming light into the camera 20 in order to capture the user's 24 image. The light 17 from the light source 134 is deflected off of the optical path 18 to allow the incoming light 19 to be reflected into the camera 20. In a second position 132, the mirror element 128 is rotated to reflect light 17 projected from a light source 134 onto the screen 12, where it is viewed by the user 24. In the second position 132, the mirror element 128 appears dark to the camera 20 so that the camera does not capture any image when the mirror element 128 is in the second position.

In the example shown in FIG. 8, the mirror element 128 is positioned to reflect incoming light 19 at a 90 degree angle in order to allow the incoming light 19 carrying the user's 24 image to be reflected into the camera 20. The user's image is reduced by an optical system 136 in an effort to provide a compact viewing system 110. The mirror element 128, in hidden lines, shows the second position 132 for the element 128 in which the mirror reflects the projected light from light source 134 at a 110 degree angle in order to project the light 17 onto the screen 12.

This arrangement is common to all elements 128 of the array. Typical array sizes are 640×480. Each element 128 corresponds to one pixel of the displayed image. As Super-VGA and High Definition Television (HDTV) are further developed, it is anticipated that the resolution of the micro-mirror array will likewise advance. The complete array can consist of three segments, each displaying one of the three primary colors which are recombined into the displayed image, or a single array in which the colors are sequentially displayed. In the first case, each array is illuminated by one of the primary colors. The camera 20 is configured to receive the image from only one of three arrays in order to capture the full image in the first case. In the latter case, a color wheel 136 sequentially illuminates the mirror element 128 with the three primary colors. Each mirror element 128 of the array reflects a color onto the screen 12. The array as a whole, projects an image onto the screen 12. In the second case, only one array is used for both image projection and image capture. In either case, since the colors are produced prior to being transmitted to the array, the light being transmitted to the camera 20 is not filtered, and thus the user's 24 image is in full color.

Figure 9:
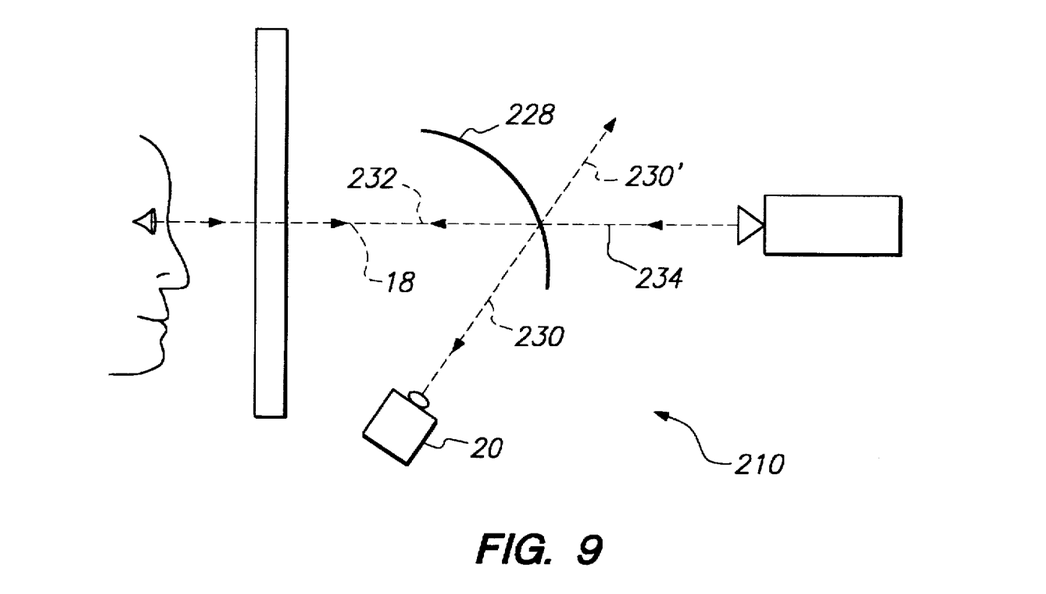
FIG. 9 is a third and alternative embodiment of the video conferencing system of the present invention, wherein a dichroic mirror separates out light in the infrared range and provides an infrared image to the camera.

Referring now to FIG. 9, a third and alternative embodiment 210 of the video conferencing system of the present invention is shown. In this alternative embodiment 210, a dichroic filter 228 is placed to intercept the optical axis 18. The dichroic filter 228 separates out infrared light 230 from colored light 232 in both directions. The colored light 232 is allowed to pass through the dichroic filter 228, while the infrared light 230 is reflected off of the dichroic filter 228. Incoming infrared light 230 is directed toward the camera 20, while the infrared component of the projected light 234 is deflected away from the camera 20. The camera 20 captures the infrared light 230 as an image. Since the colored light 232 is not reflected into the camera 20, the image captured by the camera 20 is in black and white.

The invention has now been explained with reference to specific embodiments. Other embodiments will be apparent to those of ordinary skill in the art in light of this disclosure. Therefore, it is not intended that this invention be limited, except as indicated by the appended claims.

What is claimed is:

1. A video conferencing system providing eye contact between conference participants, the system comprising:
   an image projection apparatus for transmitting a first image along an optical path;
   means for displaying the first image transmitted by the image projection apparatus, the means for displaying being disposed in series along the optical path and coupled to receive the first image;
   a switching device for controlling use of the optical path and transmitting images, the switching device having a rotatable disk having a transparent portion and a wedge-shaped mirrored portion disposed between the image projection apparatus and the means for displaying, and positioned with a portion in the optical path; and
   an image capturing apparatus optically coupled to the switching device, the image capturing apparatus being positioned to receive a second image transmitted by the switching device.

2. The system of claim 1 further comprising an optical system disposed between the switching device and the means for displaying, the optical system providing a means for modifying the size of images.

3. The system of claim 1 wherein the image projection apparatus is a rear-projection projector that transmits an image along the optical path, and the image capturing apparatus is a camera.

4. The system of claim 1 wherein the means for displaying is a highly transparent screen.

5. The system of claim 1 wherein a greater portion of the disk is transparent than is mirrored.

6. The system of claim 1 wherein the ratio of transparent portion to mirrored portion of the disk is in the range of 50% transparent/50% mirrored to 95% transparent/5% mirrored.

7. The system of claim 1 wherein the rate of revolution of the disk is between 10 and 40 revolutions per second.

8. A video conferencing system comprising:
   a first video conferencing station having a first rear-projection projector having an input and an output for transmitting a first image along a first optical path; a first transparent screen for displaying the first image transmitted by the first projector, the first transparent screen being disposed in series along the first optical path and coupled to the first rear-projection projector to receive the first image; a first switching device for controlling use of the first optical path, the first switching device being disposed between the first projector and the first transparent screen, and positioned with a portion in the first optical path; and a first camera having an input and an output, the first camera being optically coupled to the first switching device; and
   a second video conferencing station having a second rear-projection projector having an input and an output, for transmitting a second image along a second optical path, input of the second projector coupled to the output of the first camera; a second screen for displaying the second image output by the second projector, the second screen disposed to receive the second image from the second projector; a second switching device for controlling use of the second optical path, the second switching device being disposed between the second projector and the second transparent screen, and positioned with a portion in the second optical path; and a second camera having an input and an output, the second camera being optically coupled to the second switching device, the output of the second camera coupled to the input of the first projector;
   wherein the first and second switching devices each include a dichroic filter for passing colored light and reflecting infrared light and wherein the first and second cameras are infrared cameras.

9. A method for video conferencing utilizing time sharing across a single, two-way optical path, the method comprising the steps of:
   transmitting a first image across the optical path in a first direction during a first time period;
   receiving a second image across the optical path in a second direction that is opposite the first direction during a second time period; and
   controlling use of the optical path by alternating between allowing transmission of the first image along the optical path in the first direction during the first time period and blocking transmission of the first image across the optical path during the second time period by pivoting a micro-mirror array from a first position to a second position, where the first position transmits the first image across the optical path and the second position transmits the second image to an image capture device.

10. The method of claim 9 wherein the step of transmitting a first image further comprises projecting the first image.

11. The method of claim 9 wherein the blocking transmission of the projection of the first image and the reflecting of the second image are performed simultaneously.

12. The method of claim 9 wherein the step of controlling the use of the optical path is repeated periodically at a rate of 30 times per second.

13. The method of claim 9 wherein following the substep of pivoting the micro-mirror device, the method further comprises the step of reflecting the second image off of the micro-mirror array at an angle along a second optical path.

14. The method of claim 13 wherein following the step of reflecting the second image, the method further comprises the step of capturing the reflected second image.

* * * * *